United States Patent [19]

Castiglioni

[11] Patent Number: 4,641,559
[45] Date of Patent: Feb. 10, 1987

[54] EQUIPMENT FOR SLITTING CONTINUOUS TAPES INTO STRIPS WITH SHAPED SIDE PROFILE, IN PARTICULAR FOR METAL SHEET

[75] Inventor: Giovanni P. Castiglioni, Castellanza, Italy

[73] Assignee: F.I.C.I. Finanziaria Industriale Commerciale Immobiliare S.p.A., Milan, Italy

[21] Appl. No.: 816,898

[22] Filed: Jan. 7, 1986

[30] Foreign Application Priority Data

Jan. 23, 1985 [IT] Italy .............................. 19197 A/85

[51] Int. Cl.[4] .......................... B23D 25/12; B26D 1/62
[52] U.S. Cl. .......................................... 83/333; 83/46
[58] Field of Search ..................................... 83/333, 46

[56] References Cited
U.S. PATENT DOCUMENTS

| | | | |
|---|---|---|---|
| 219,617 | 9/1879 | Cady | 83/333 |
| 1,274,623 | 8/1918 | Spiegel | 83/333 |
| 3,517,532 | 6/1970 | Zilkowsky et al. | 83/664 |
| 4,470,331 | 9/1984 | Eiting et al. | 83/333 |

Primary Examiner—Donald R. Schran
Attorney, Agent, or Firm—Diller, Ramik & Wight

[57] ABSTRACT

Equipment for continuously slitting metallic tapes into longitudinal strips of sinusoidal-like shape including a pair of slitting cylinders, a motor for rotating the cylinders, the cylinders having a set of blades with shaped peripheral cutting edges, the blades being positioned on the cylinders in superimposed and staggered relationship to provide cooperative shear-type cutting action, the cutting edges of the slitting cylinders being alternatively in facing and non-facing relationship to each other, the blades being formed as bells provided with central and axial bores for receiving between an inner surface thereof and supporting shafts a spacer ring, a radially elastic couple between two of the blades facing each other, and a spacer element between two of the blades which are in non-facing relationship to each other.

5 Claims, 5 Drawing Figures

EQUIPMENT FOR SLITTING CONTINUOUS TAPES INTO STRIPS WITH SHAPED SIDE PROFILE, IN PARTICULAR FOR METAL SHEET

The present invention relates to equipment for the continuous cutting of longitudinal tapes, in particular provided for machines and plants effecting the cutting of metal-plate tapes into strips with shaped, essentially sinusoidal and/or mixed profile, and destined to pressing or to shearing.

Slitters are known, used, e.g., to carry out the slitting of a continuous tape of metal plate into a plurality of continuous strips placed side by side, sinusoidal-shaped, such as those described in U.S. Pats. Nos. 1,433,138 and 3,517,532.

Said devices are provided with simple rotary slitting rings superimposed and provided with sinusoidal slitting surfaces opposite and conjugate and cooperating with each other.

Within said devices the metal-plate tape is made run, and each one of these rings cooperates with its respective conjugate ring.

Each of these rings has a slitting edge peripherally extending on a plane essentially transversal relatively to the plane on which the metal plate lays.

The known slitting devices slit the tapes of metal plate, or of other material, into strips with sinusoidal edges conjugated with each other.

The sinusoidal or strips so obtained in continuous production include a plurality of defects, mainly due to the difficulty of keeping the slitting elements or rings cooperating with each other in a constantly correct mutual position.

In other words, no axial clearances must exist between the shafts or cylinders rotatably supporting said slitting elements.

Such clearances result indeed particularly noxious for the integrity of the same cutting edges, above all if they are present in a plurality of couples, to carry out the slitting of a plurality of strips side by side.

Moreover, in case of the contemporaneous production of a plurality of strips with conjugated sinusoidal-shaped edges, deformations occur or the edges mainly due to the cutting stresses, which thus do not allow coils of shaped strip to be made on a commercial scale ready for use and of good quality.

The purpose of the present invention is to solve the latter problems by providing equipment for the slitting of strips with shaped side profile, and obtaining a finished product of good quality.

A further purpose is to achieve the longest useful life of cutting rings, and to prevent their deterioration.

These and further purposes according to the present invention are achieved by providing equipment for the continuous slitting of tapes of material, in particular of tapes of metal plate and the like, into longitudinal strips with shaped side profile, essentially of sinusoidal and/or mixed outline, of the type comprising a base onto which a stand is positioned, supporting a pair of slitting cylinders, means for driving the rotation of said cylinders and related motor means being provided, said slitting cylinders essentially bearing a set of blades with shaped peripheral cutting profile, said blades being positioned on said cylinders in a superimposed and staggered fashion, such as to provide a conjugated coupling of the shears type, characterized in that said slitting cylinders support rigidly said plurality of blades positioned on shafts alternatively with cutting edges facing and not facing to each other, said blades being formed as bells provided with central and axial bores, and receiving, between an inner surface of them and the surface of supporting shaft a spacer ring, between two blades facing to each other at least a couple of radially elastic means, and between two blades not facing each other at least a spacer element.

The structural and functional characteristics and the advantages of equipment according to the present invention shall be better understood from the disclosure of a preferred form of embodiment thereof, referred to the related schematic drawings, wherein.

Figure 1:
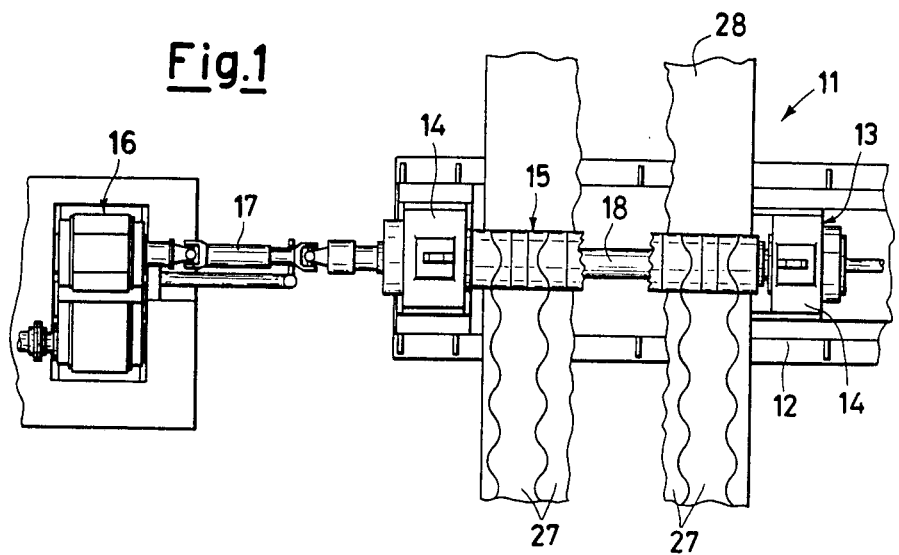
FIG. 1 is a plan view of equipment according to the present invention.
Figure 2:
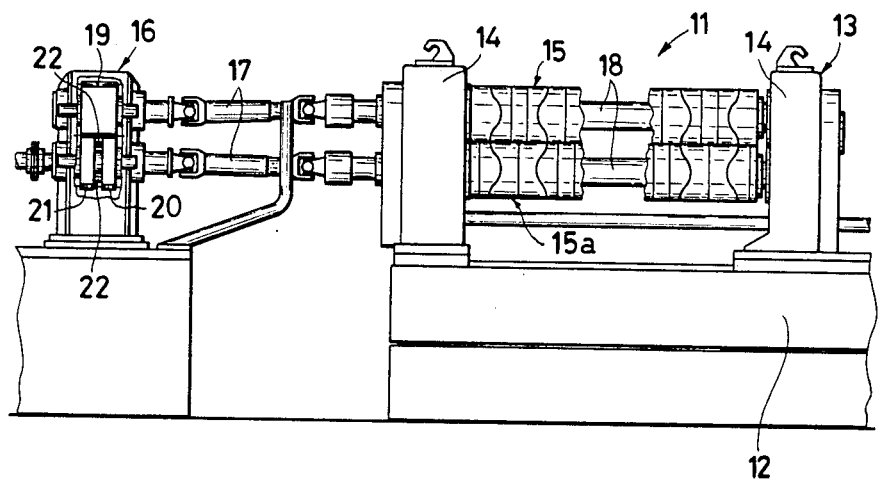
FIG. 2 is a front view of a detail of the equipment of FIG. 1.

Referring to FIG. 1, a slitting equipment 11 according to the present invention
essentially comprises a base 12 on which a stand 13 is placed, linked, by means of driving means
to a related motor means (not shown), and essentially constituted by a couple of shoulders 14 supporting a couple of upper (15) and lower (15a) slitting cylinders.

A pinion box 16 is provided wherein stack adjustment and zeroing is e.g. provided, which can be constituted by a first helical gear wheel 19, operatively linked to a second helical gear wheel constituted by portions 20 and 21 which can be moved toward to each other, and return elastic means 22 being interposed therebetween.

In between the pinion box 16 and the cutting cylinders 15, 15a of the box 13, a couple of extensions 17 are provided, such extensions being so made as to obtain a perfect homogeneous and in-phase rotation of shafts 18 supporting the couple of cutting cylinders 15,15a, independently from the distance between their centres.

Each one of said slitting cylinders 15, 15a is positioned on its shaft 18 by means of keys (not shown).

Figure 4:
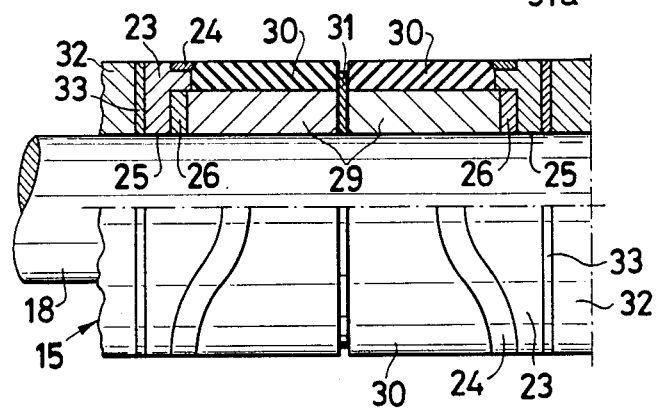
FIG. 4 is an enlarged partly sectional view of a portion of cylinders of FIG. 3.

As shown in FIG. 4, an upper slitting cylinder 15 supports a plurality of blades 23, e.g., with sinusoidal peripheral outline, and with an added cutting element 24.

On the lower slitting cylinder 15a a plurality of blades 23a with cutting elements 24a is supported in the same way.

Said blades 23 and 23a are positioned on the two slitting cylinders 15, 15a staggered relatively to each other, so as to obtain a conjugated coupling of the shears type.

Each blade 23, 23a, is made in form of cup or bell and is centrally and axially bored at 25 so as to make it possible to be positioned on the shaft 18. Each blade 23, 23a houses between its cylindrical inner surface and the shaft 18 a spacer ring 26, 26a.

For the purpose of slitting a plurality of strips 27 obtained from a metal-plate tape 28 being fed from a roll (not shown), each sequential blade 23, 23a is complementary positioned on the shafts in opposing cutting relationship.

More precisely, two blades 23, or two blades 23a, provided with cutting edges 24, 24a facing to each other, are separated by a pair of spacers 29 supporting elastic means or sleeves 30, 30a, e.g., of rubber. Between said spacers 29 and between said elastic means 30, 30a, are interposed disc-shaped compensator elements 31, 31a disc-shaped, of indeformable plastic material.

Two other blades 23 and two blades 23a (FIG. 5), positioned back-to-back, have interposed between them a spacer element 32, 32a, e.g., a metal ring, which envisages on opposite sides two compensator elements 33 or 33a facing the base of said blades.

Figure 3:
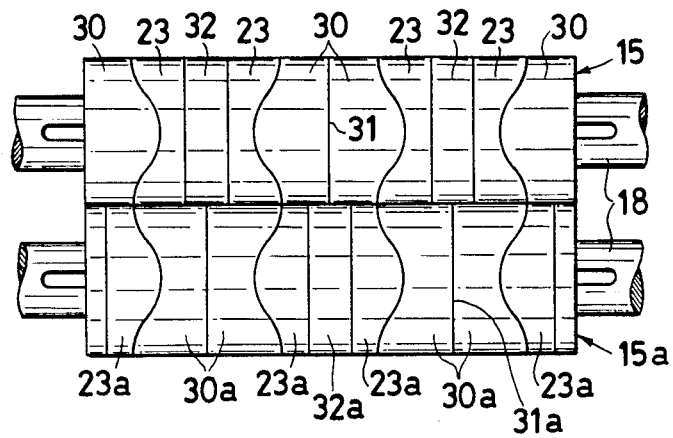
FIG. 3 is an enlarged view of a couple of slitting cylinders of the equipment of FIG. 1.

As it can be observed in FIG. 3, the upper blades 23 are positioned back-to-back with the interposition of the spacer elements 32 and the compensator elements elements 33 therebetween. A couple of elastic elements 30a with interposed compensator element 31a are carried by the lower cylinder 15a.

The cutting edges 24 of the upper blades 23 interact with the cutting edges 24a of the lower blades 23a facing each other.

It can be observed that the upper blades 23 with cutting edges 24 facing to each other and containing the elastic means 30 and the related compensator element 31 are opposed by the cutting elements 24a of lower blades 23a positioned back-to-back, containing a related spacer element 32a and compensator elements 33a.

Figure 5:
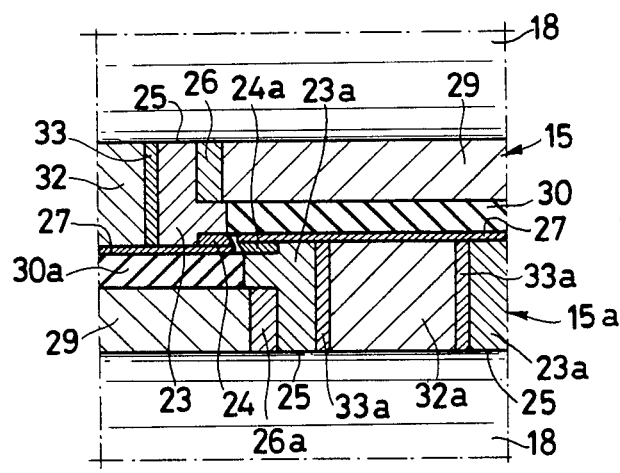
FIG. 5 shows a portion of two cylinders in the operative step of strip slitting from the tape.

In FIG. 5, the operative interaction is shown between the elements on the upper cutting cylinder 15 and the complementary elements of the lower cutting cylinder 15a.

It is interesting to note that at least an elastic element 30 of the upper cutting cylinder 15 accompanies upwards the strip 27 slitted by the cutting edge 24a of the blade 23a, and contemporaneously the elastic element 30a of the lower cutting cylinder 15a accompanies downwards the parallel strip 27 slitted by the cutting edge 24 of the blade 23.

The clearance between the cutter edges 24 and 24a of respective blades 23 and 23a is secured and adjusted by the compensator elements 31, 31a and 33, 33a, so as to maintain a perfect and continuous slitting efficiency.

It should be moreover noted that the elastic elements 30 and 30a, once mounted, result to have a diameter longer than of blades and related cutting edges.

In this way, during the slitting stage, said further compressed elements of absorb the cutting forces, thus avoiding the deformations of burring, deep-drawing, and so forth.

The slitting of the strips 27 from the metal plate 28 being fed to the slitting cylinders 15, 15a results in sharp edges because the blades and related cutting edges complement each other.

It can be noted that advantageously for periodically sharpening the cutting edges 24, 24a of the blades 23, 23a, inside the same blades a spacer ring 26, 26a has been provided.

Such a spacer ring 26, 26a acts as compensator element, in that during the sharpening a side peripheral material withdrawal from the cutting edge occurs.

Such a decrease in blade thickness is followed by an equal decrease of the spacer ring 26, 26a and the perfect total arrangement on the whole slitting cylinder is restored, by adding suitable additional spacer rings (not shown), positioned on opposite sides in the nearby of the spacer ring 32, 32a.

Such sharpening, by being executed laterally on the cutting edge does not produce any pitch variation, the circumference after the resharpening remaining unchanged.

I claim:

1. Equipment for the continuous slitting of tapes of material, in particular tapes of metal plate and the like, into longitudinal strips with shaped side profile, essentially of sinusoidal and/or mixed outline, of the type comprising a base onto which a stand is positioned, supporting a pair of slitting cylinders, means for driving the rotation of said cylinders and related motor means being provided, said slitting cylinders essentially having a set of blades with shaped peripheral cutting edges, said blades being positioned on said cylinders in superimposed and staggered fashion, such as to provide a conjugated coupling of the shears type, characterized in that said slitting cylinders support rigidly said set of blades positioned on shafts alternatively with said cutting edges facing and not facing to each other, said blades being formed as bells provided with central and axial bores, and such as to receive between an inner surface of them and the surface of the supporting shaft a spacer ring, between two blades facing to each other at least a couple of radially elastic means and between two blades not facing to each other at lest a spacer element.

2. Slitting equipment according to claim 1, characterized in that said radially elastic means are made of rubber or similar material, with profile complementary both to the facing and mutually opposite blades, and to the adjacent blades.

3. Slitting equipment according to claim 1, characterized in that between said couple of radially elastic elements at least a compensator element is provided.

4. Slitting equipment according to claim 1, characterized in that on opposite sides of said at least one spacer element compensator elements are provided.

5. Slitting equipment according to claim 1, characterized in that said cutting edges are accomplished by means of the addition of hard metal peripherally applied on said bell-shaped blades.

* * * * *